Nov. 3, 1931.  J. C. POTTER  1,829,943
CONTROL DEVICE FOR MILLING MACHINES
Filed Dec. 8, 1921    3 Sheets-Sheet 1

Nov. 3, 1931.  J. C. POTTER  1,829,943
CONTROL DEVICE FOR MILLING MACHINES
Filed Dec. 8, 1921  3 Sheets-Sheet 3

Inventor
James C. Potter
By Chas. J. Williamson
Attorney

Patented Nov. 3, 1931

1,829,943

UNITED STATES PATENT OFFICE

JAMES CHARLES POTTER, OF PAWTUCKET, RHODE ISLAND

CONTROL DEVICE FOR MILLING MACHINES

Application filed December 8, 1921. Serial No. 520,884.

My invention relates to milling machines of the type such as that forming the subject of my Patents No. 1,060,705, issued May 6/13, and No. 1,186,681, issued June 13/16, in which a plurality of work tables or supports mounted on or carried by a rotatable support or turret are employed, the work on the respective tables or supports being in turn presented for action of the milling tool. In machines of this type having, as in the case of the machines illustrated in such patents, two work tables or supports situated on opposite sides of the turret axis, the cycle of operation consists in first unlocking the turret, next revolving it through a half revolution to shift one work table from position for the milling tool to cut the work upon such table, and simultaneously to shift the other work table from such position so that finished work, if thereon, may be removed and new work applied; next the stopping and locking of the turret with the work tables in such interchanged position; and finally the feed movement of the work. The object of my present invention, generally stated, is to increase the out-put of milling machines of this type which in the embodiment of my invention that I shall hereafter describe is accomplished by effecting the indexing operation or the interchange of positions of the work tables or supports automatically so that the operator may devote his time and labor to the operations of loading and unloading the tables and by automatically changing the rate of feed so that the feed is faster than the regular cutting rate of feed when cutting is not being done, as in the case of several pieces of work spaced apart on the same table or work support, when the spaces or intervals between the pieces of work pass the tool, time being lost, of course, when the travel is at the cutting rate of feed when no work is being cut.

Another object of my invention is to effect either or both of the automatic actions just mentioned by devices that are at once simple, quick and otherwise efficient. For the attainment of these objects my invention consists in a construction described by or included within the terms or scope of the appended claims.

In the annexed drawings;

Figs. 6 and 7 are detail views of the cam and roller device to hold the lock bolt out of contact with the turret.

Figure 1:
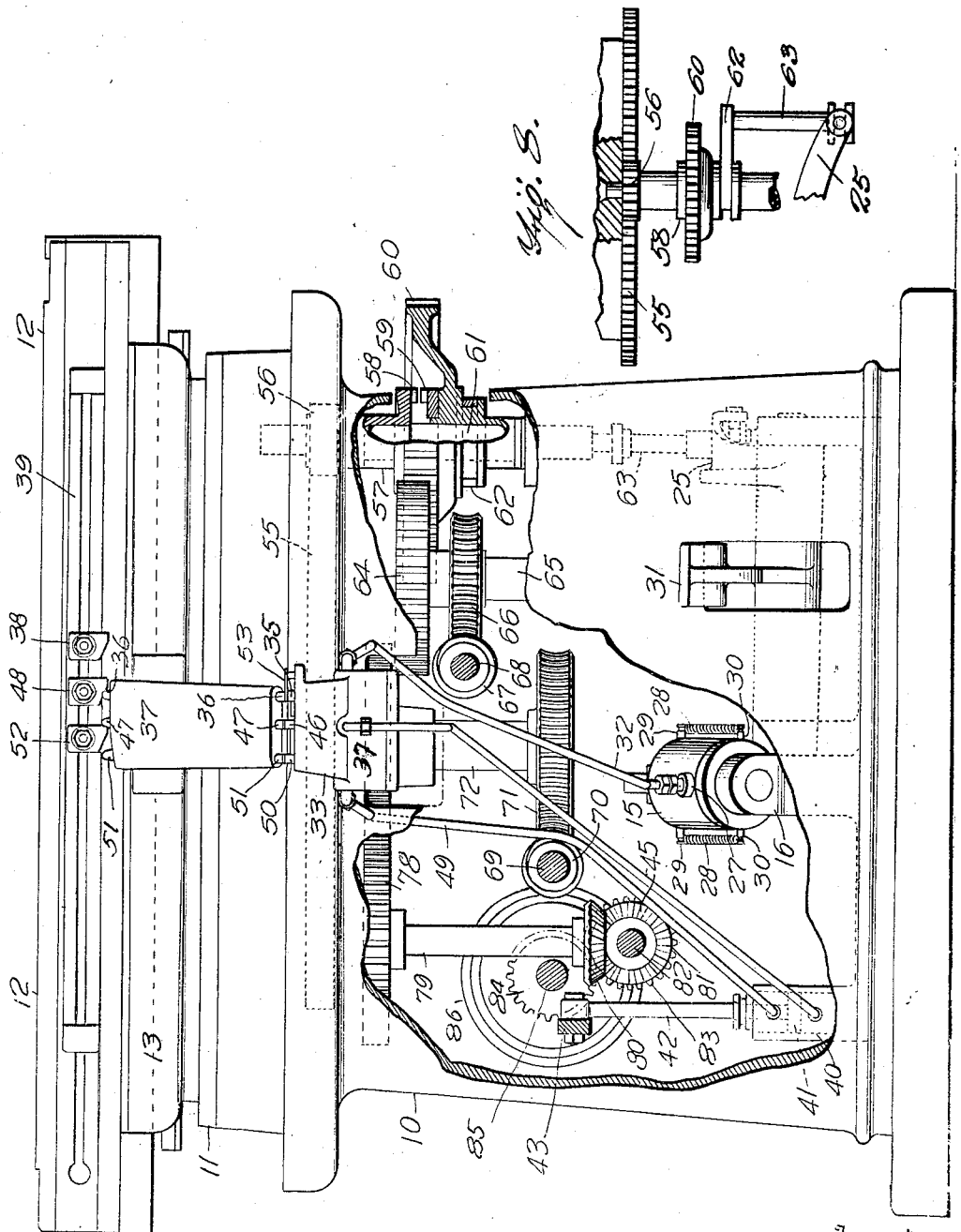
Fig. 1 is a view in side elevation with parts in section of portion of a milling machine embodying my invention.
Figure 2:
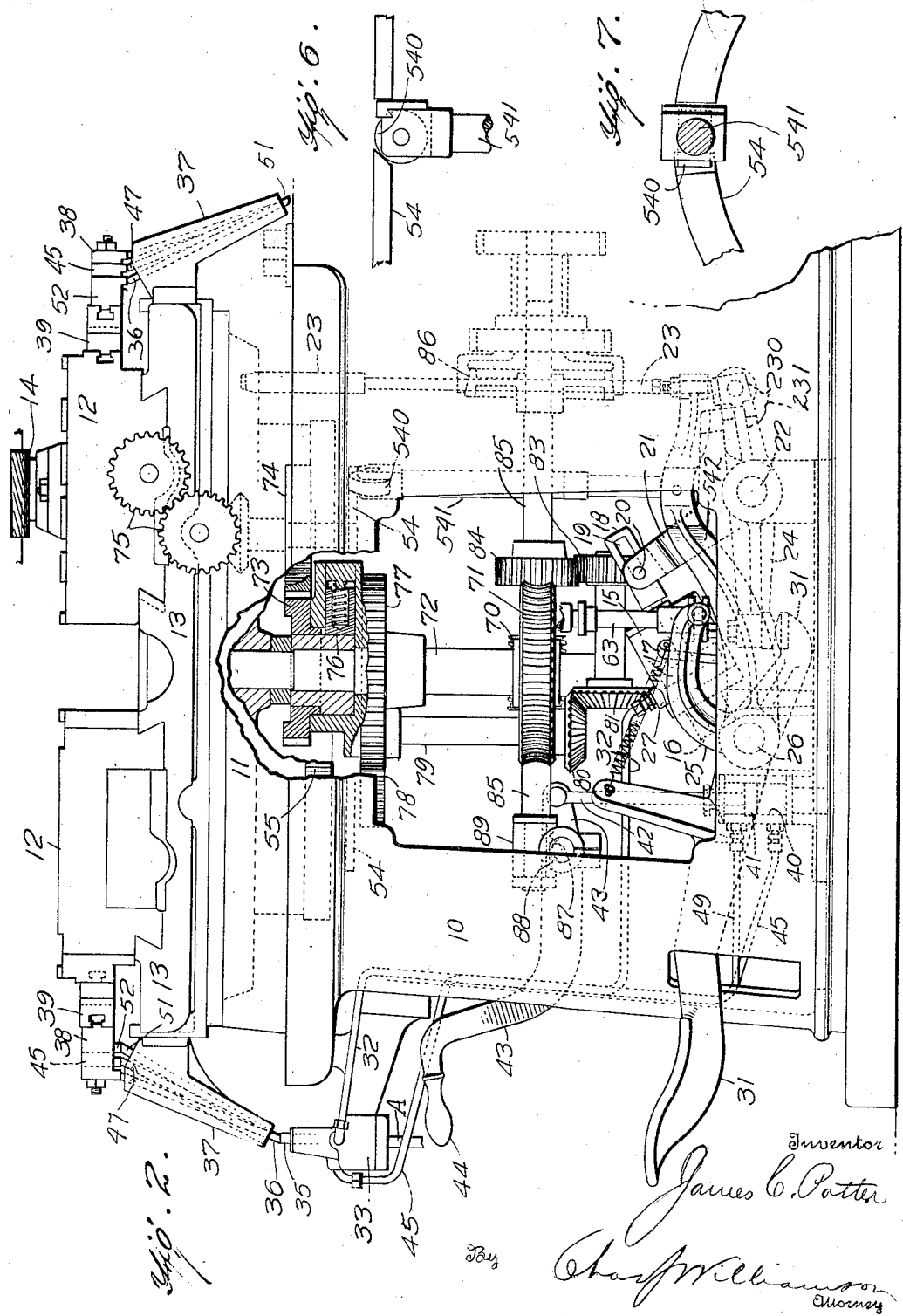
Fig. 2 is a front elevation thereof.
Figure 3:
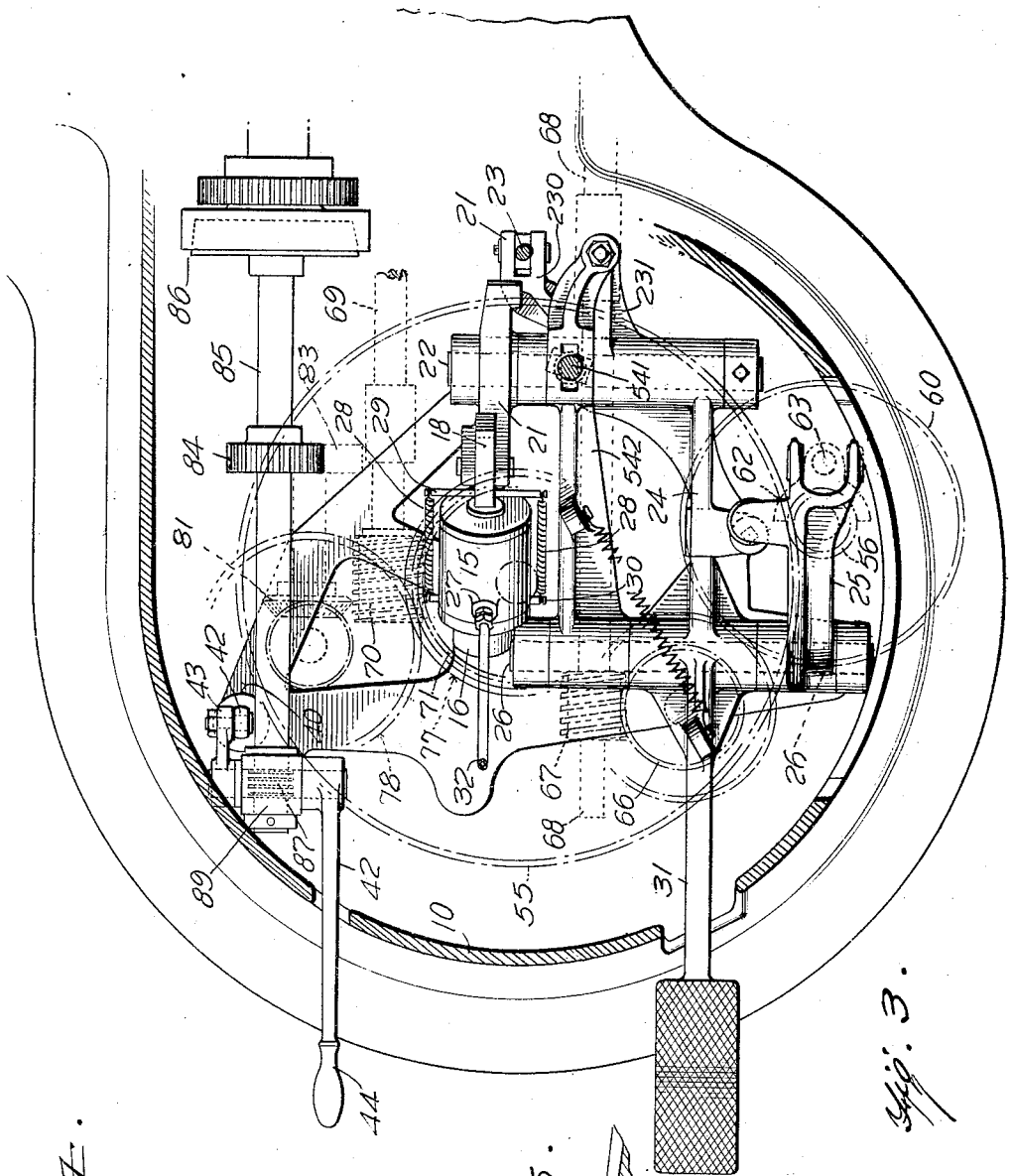
Fig. 3 is a plan view of the automatically operating control mechanism.
Figure 4:
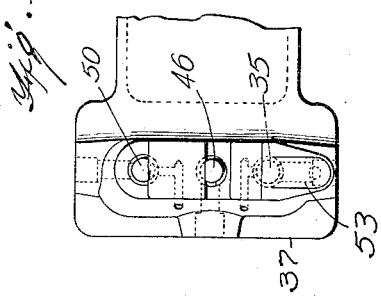
Fig. 4 is a detail view in plan showing the valve chest.
Figure 5:
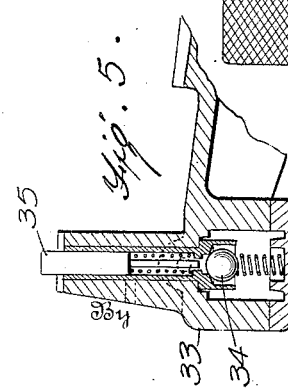
Fig. 5 is a vertical section thereof.

Referring now in detail to the drawings, it will be seen that I employ a frame that includes a hollow base or pedestal, 10, upon the top of which is mounted a turret, 11, that supports upon its upper side two side by side slides or work holders, 12, each in its guides, 13, the two slides being thus on opposite sides of the vertical axis of rotation of the turret and reciprocable beneath the milling tool spindle, 14, one of the slides or work holders being in the operation of the machine beneath the cutter and the other beyond the cutter at the front of the machine for ready access of the workmen thereto to remove finished work or apply new work.

As in the milling machine shown in my above mentioned patents, the rotation or indexing of the turret is effected by power taken from the driving shaft and the feed of the work is also effected by power taken from the driving shaft, but as the gear connections by which the indexing and feed motions are produced does not in itself form an essential part of my invention, any detailed description and illustration thereof is unnecessary. Suffice to say that the gear connections for indexing and feed, include suitable clutches. A locking bolt is provided which enters holes in the turret to secure the turret at the end of each half revolution, which locking bolt after being withdrawn from a turret hole to allow rotation of the turret is restrained in withdrawn position until the half revolution of the turret is accomplished, whereupon the bolt moves into locking engagement therewith.

The movement of the locking bolt to release the turret, and of the clutches that control the indexing of the turret and the feed of the work tables is produced by fluid pressure mechanism that comprises a cylinder and a piston and valve-operating devices carried by the work tables, so that at predetermined points in the travel of said tables the fluid pressure devices will act, such a mechanism having the qualities of simplicity, compactness, and quickness of action.

For the release of the locking bolt and the throw of the clutch for indexing, a single fluid pressure device is employed that consists of a cylinder, 15, mounted at one end upon a bracket, 16, within the pedestal, and a piston, 17, the portion of the piston rod, 18, outside the cylinder having a longitudinal slot, 19, one end of which engages a cross pin, 20, in one arm of a bell crank lever, 21, mounted on a rock shaft, 22, the other arm of the bell crank lever being adapted to act on the lever, 230, connected with the lower end of the vertical turret-locking bolt, 23. The bell crank lever has an arm, 24, whose free end is situated to engage the lever, 25, which controls the turret indexing clutch, and which lever, 25, is on a rock shaft, 26. Compressed air or other fluid under pressure may enter the cylinder, 15, through a port, 27, at one end thereof, for moving the bell crank lever, 21, in the direction to withdraw the locking bolt, 23, and, when such bolt is withdrawn from the turret to engage the clutch of the turret indexing mechanism, the return movement of the piston is accomplished by a spring device, which, as shown, consists of two coil springs, 28, on opposite sides of the cylinder, which at one end engage a cross bolt, 29, on the piston rod, and at the other end being attached to studs or pins, 30, projecting from the cylinder side. The slotted connection between the piston rod and the bell crank lever, 21, is provided because a treadle, 31, mounted on the rock shaft, 26, is employed to enable the release of the locking bolt and the operation of the indexing clutch independently of the fluid pressure device which may be necessary, for example, in setting up jobs and under circumstances when compressed air or other fluid under pressure is not available. The treadle lever, 31, passes beneath the lever arm, 24, and acts to raise it.

A pipe, 32, connects the cylinder port, 27, with a valve box, 33 (to which air is supplied by a pipe A from a suitable source not shown), on the front of the machine near the top of the pedestal, 10, which contains a spring-seated ball valve, 34, which normally prevents the flow of fluid under pressure to the cylinder, 15, and which is movable from its seat to allow the flow of fluid under pressure to the cylinder, 15, by the engagement with it of a vertically slidable plunger, 35, whose upper end projects from the valve box in position to be engaged by the lower end of a rod or pin, 36, slidable in a bracket, 37, secured to the side of the turret, 11, the upper end of said rod or pin, 36, being in the path of a dog, 38, adjustably secured in a T-slot in a dog bar, 39, secured to the outer side of the work table or slide, 12, it being understood that each slide, 12, has a similar equipment of dog bar and dog, and that the turret, at diametrically opposite points, has duplicate brackets, 37, and sliding pin equipment, these duplicate devices being in succession by the half revolution of the turret brought into cooperative relation with the valve box devices, which, as will be presently pointed out, include valves and operating pins that control clutches that determine the rate of feed of the work, the feed during cutting being at one rate and the feed, when no cutting is being done, as when a space or interval between pieces of work on the table is presented opposite the cutter being at faster rate.

The fluid pressure device for controlling the rate of feed of the work or work tables comprises a cylinder, 40, mounted within the pedestal, 10, near the bottom thereof, and a piston, 41, the piston rod, 42, being connected at one end with a lever, 43, that is connected with the clutch device that controls the feed, and which lever preferably has a handle, 44, to enable the movement of the feed clutches to be effected by hand should that be desired as when no fluid under pressure is available or there are other reasons making hand movement desirable. The cylinder, 40, has near each end a port so that movement of the piston in both directions may be effected by fluid pressure admitted alternately at opposite ends of the cylinder. In the arrangement shown in the drawings, when compressed air or other fluid under pressure is admitted below the piston, the fast feed clutch is disconnected and the slow feed motion is produced, while when pressure is admitted above the piston, the fast feed gearing is put in operation. A pipe, 45, connects the lower end of the cylinder, 40, with the valve box, 33, in which is a valve similar to the ball valve, 34, and which valve may be unseated by a vertically slidable plunger, 46, which is adapted to be depressed by a pin, 47, in the bracket, 37, when a slow feed dog, 48, carried by the dog bar, 39, engages said slidable pin. From the port opening into the upper end of the cylinder, 40, a pipe, 49, leads to the valve box, 33, which has a ball valve similar to the ball valve, 34, for controlling the flow of compressed air or fluid under pressure to the upper end of the cylinder, 40, which ball valve is unseated by a slidable pin, 50, in the valve box whose upper end is in the path of a slidable pin, 51, mounted in the bracket, 37, and whose upper end is in the path of a fast feed dog, 52, mounted on the dog bar, 39. In order that each dog may operate only its own valve mechanism, the ends of the slidable pins which they strike are situated so that the proper pin is engaged by the appropriate dog, this arrangement being best shown in Fig. 1. The several ball valves in the valve casing are mounted in separate valve chambers. The pins 36, 47 and 51 are subjected to no pressure which would lift them out of their guide openings in the bracket.

The three valve-operating plungers are alike excepting the plunger, 36, which controls the release of the turret locking bolt which has a lateral extension, 53, at its top with which the slidable pin, 36, continues in engagement as the turret revolves, for a sufficient length of time to assure the locking bolt being held withdrawn from the turret by the action of the cylinder, 15, and its piston, until the customary cam plate, 54, engaging a roller, 540, on the upper end of a rod, 541, pivoted to a lever, 542, that engages an arm, 231, of the lever, 230, positively holds the locking bolt disengaged from the turret until the half revolution of the turret has been accomplished, and the reengagement of turret and locking bolt must take place. A spring, acting on the lever, 542, yieldingly holds the roller, 540, against the cam, 54. By the time indexing is completed and the locking bolt should reengage the turret, the piston, 17, in the cylinder, 15, has been retracted by the spring device acting upon the piston rod, and thereby the end of the slot, 19, which acts upon the cross pin, 20, of the lever, 21, is withdrawn from engagement with such cross pin, so that the locking bolt is free to snap or spring into locking engagement with the turret the instant the indexing motion is completed. During the indexing operation, the pressure of the cylinder, 40, is cut off and the exhaust is open the exhaust connection not being shown.

While, as before stated, the gear connections for indexing and the feed motions are not an essential part of my invention, perhaps a brief description of such portions thereof as appear in the drawings may be desirable.

For indexing the turret has a gear, 55, with which meshes a pinion, 56, on the upper end of a sleeve, 57, whose lower end has a clutch collar, 58, with which a clutch face, 59, on a gear, 60, slidably mounted on the same shaft, 61, on which the pinion is mounted may be engaged and thus rotate the pinion sliding movement of the gear, 60, being effected by a clutch arm, 62, on a vertically movable rod, 63, which is engaged by the lever, 25, and thereby moved. The gear, 60, is in mesh with and receives motion from a gear, 64, on the same shaft, 65, with a worm wheel, 66, which is engaged by a worm, 67, on a shaft, 68, that receives motion from the main driving shaft of the machine.

There are two shafts which receive motion from the main driving shaft of the machine either one of which at a time may drive the feed mechanism, one of which shafts produces the slow working feed and the other the faster feed. The shaft, 69, for producing the slow working feed has a worm, 70, which meshes with a worm wheel, 71, on a vertical shaft, 72, which is concentric with the turret upon which is loosely mounted a gear, 73, which meshes with a gear, 74, that drives a train, 75, by which the feed motion of each slide, 12, is produced. The gear, 73, by a clutch device, 76, receives its motion from the shaft, 72, to impart the slow feed, while to impart the fast feed, the gear, 73, is connected with and driven by a gear, 77, loose on the shaft, 72, and when driven, as about to be explained, revolves the gear, 73, faster than it is revolved by its clutch connection with the shaft, 72, such clutch connection, 76, permitting the overrunning of the gear, 73, from the shaft, 72. The gear, 77, is driven by a meshing gear, 78, on a vertical shaft, 79, which has a bevel gear, 80, that meshes with a bevel gear, 81, on a shaft, 82, upon which is a spur gear, 83, in mesh with a spur gear, 84, on a shaft, 85, which by a clutch, 86, is adapted to be connected with and disconnected from the main driving shaft of the machine and when connected therewith drives the shaft, 85, at the rate of speed necessary to produce the fast feed of the work tables. The clutch, 86, is under the control of the lever, 43, which may be actuated by the air cylinder, 41. The movement of the clutch being produced by the longitudinal movement of the shaft, 85, which is connected with the lever, 43, by a gear segment, 87, on the lever, 43, and a rack, 88, on a sleeve, 89, on the shaft, 85.

What I claim is:

1. In a milling machine, the combination of a plurality of reciprocating independent work-holders either of which may be presented to position for operation with the same tool, automatic means for interchanging the working relation of such work-holders with the tool, and a control device for such automatic means receiving movement from one of such reciprocating work-holders.

2. In a milling machine, the combination of a plurality of reciprocating independent work-holders either of which may be presented to position with the same tool, automatic means for interchanging the working relation of such work-holders with the tool, and a control device for such automatic means receiving movement from one of such reciprocating work-holders, each of such work-holders having such a control device.

3. In a milling machine, the combination of a turret, a plurality of independent workholders carried by said turret eccentric to the axis of rotation thereof, and automatic means to index the turret including a movable control device connected with each of said work-holders, either of said work-holders being presentable to position for operation with the same tool.

4. In a milling machine, the combination of a turret, a pair of slides mounted on the turret eccentric to the axis of rotation thereof, and automatic indexing means comprising a dog carried by each of said slides.

5. In a milling machine, the combination of a turret, a pair of slides mounted on the turret eccentric to the axis of rotation thereof, automatic indexing means comprising a dog carried by each of said slides, and a single operating mechanism with which said dogs successively coact.

6. In a milling machine, the combination of a slide, means for imparting motion to said slide, a fluid pressure mechanism for operating such means comprising a cylinder and a piston, and a member receiving movement from the slide that controls the supply of fluid pressure to said cylinder.

7. In a milling machine, the combination of a turret, a pair of reciprocating slides situated on opposite sides of the axis of rotation of the turret, automatic mechanism for varying the rate of feed of such slides, and automatic turret indexing mechanism.

8. In a milling machine, the combination of a turret, a pair of reciprocating slides situated on opposite sides of the axis of rotation of the turret, automatic mechanism for varying the rate of feed of such slides, automatic turret indexing mechanism, and devices to control the operation of both such mechanisms, moving with said slides.

9. In a milling machine, the combination of a moving member of the machine, a plurality of work receiving surfaces arranged for successive cooperation with the cutter, and means to control the operation of such member comprising coacting parts, one of which is stationarily mounted and the other, in duplicate, is carried by said work receiving surfaces, such duplicate parts being successively presented for coaction with the stationary part.

10. In a milling machine, the combination of a base, a work table supporting turret mounted on such base, turret indexing means, feed mechanism, and fluid pressure operating devices controlling said indexing means and said feed means comprising a valve box mounted on the base and a plurality of valve operating devices mounted on the turret.

11. In a milling machine, the combination of a work table carrying turret, turret indexing mechanism, turret locking means, and a single fluid pressure operated device operatively connected with the turret indexing mechanism and the turret locking means.

12. In a milling machine, the combination of a plurality of reciprocating work receiving surfaces arranged for successive cooperation with the same tool, and automatic means for interchanging the working relation of such surfaces with the tool comprising fluid pressure mechanism.

In testimony whereof I hereunto affix my signature.

JAMES CHARLES POTTER.